United States Patent [19]

Korn

[11] 3,986,794
[45] Oct. 19, 1976

[54] REVERSIBLE DUCTED FAN ASSEMBLY

[75] Inventor: James A. Korn, Indianapolis, Ind.

[73] Assignee: General Motors Corporation, Detroit, Mich.

[22] Filed: June 9, 1975

[21] Appl. No.: 585,140

[52] U.S. Cl. ............................... 415/129; 416/127; 416/23; 60/226 R
[51] Int. Cl.² ........................................... F01D 1/30
[58] Field of Search ........... 415/129, 130; 60/226 R, 60/226 A; 416/23, 127, 157 B, 160, 186 A

[56] References Cited
UNITED STATES PATENTS 2,982,361  5/1961  Rosen ................................. 415/129

FOREIGN PATENTS OR APPLICATIONS 571,353  1/1924  France ............................... 416/127
453,867  2/1948  Italy ................................... 416/127

Primary Examiner—Henry F. Raduazo
Attorney, Agent, or Firm—J. C. Evans

[57] ABSTRACT

A gas turbine engine of a ducted-fan bypass type includes a fan with a plurality of circumferentially spaced airfoils thereon each including first and second portions thereof defining a forward thrust airfoil having a chord to blade spacing ratio greater than one. Each of the first and second portions are rotatably supported on the fan hub and are movable from a forward thrust position when the trailing edge of the first portion is juxtaposed against the leading edge of the second portion to a reverse thrust position wherein the first and second portions are corotated so as to locate the leading edge of the first portion in juxtaposed relationship to the trailing edge of a second portion to define a reverse thrust airfoil for producing a reverse flow of air through the fan duct passage with a resultant reverse thrust action on the gas turbine engine.

4 Claims, 4 Drawing Figures

U.S. Patent    Oct. 19, 1976    3,986,794
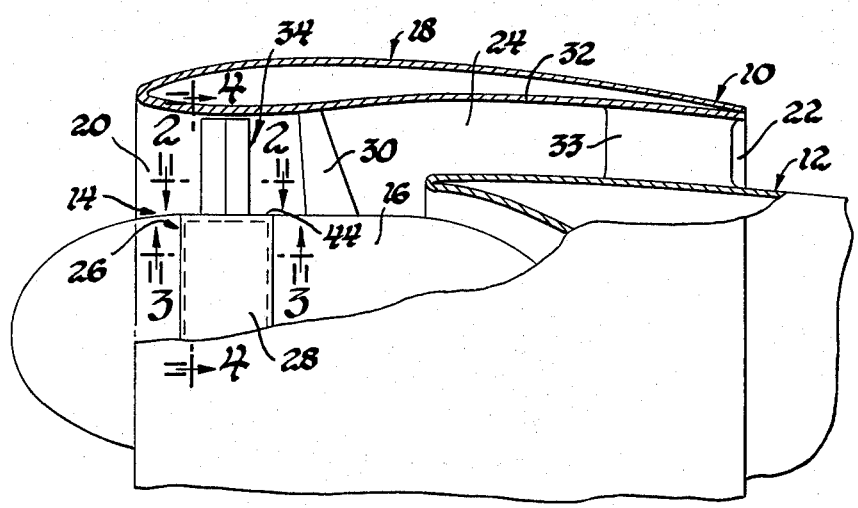
Fig. 1
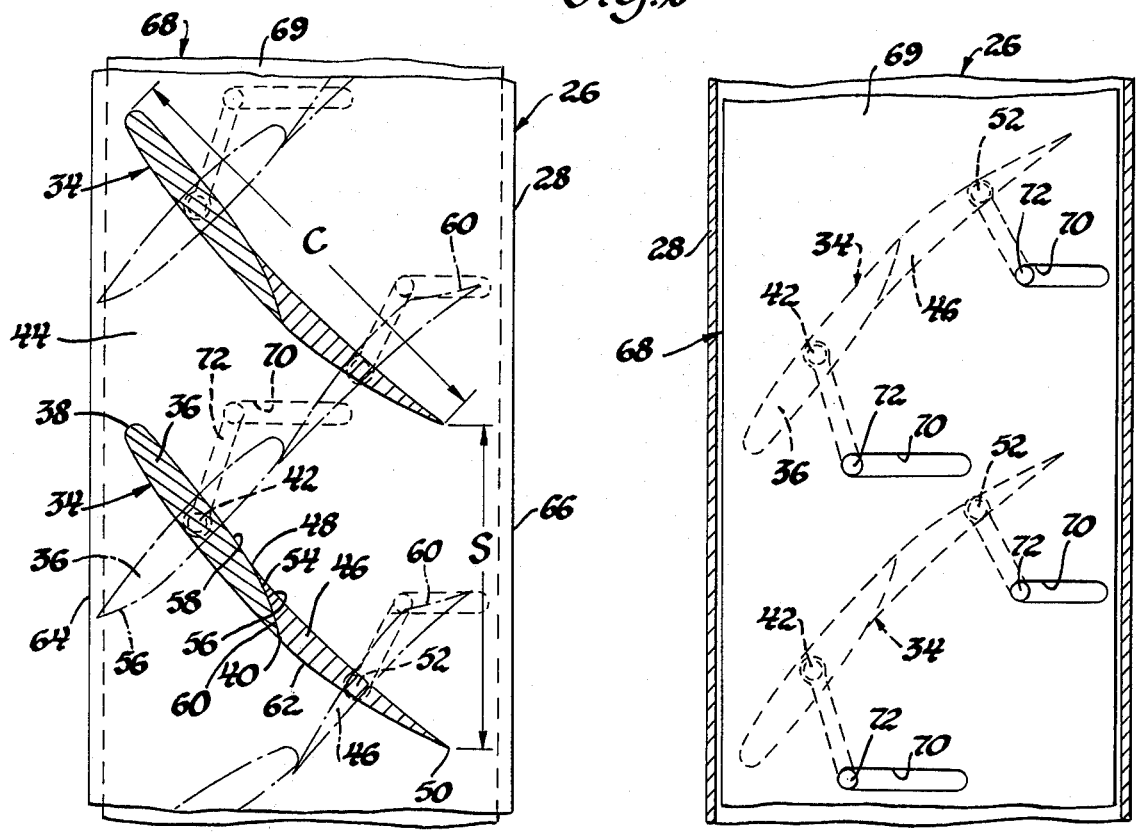
Fig. 2                                   Fig. 3
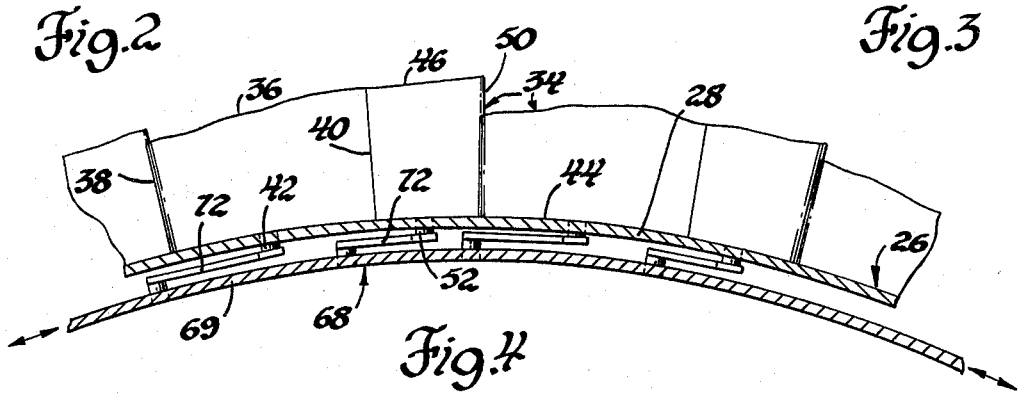
Fig. 4

REVERSIBLE DUCTED FAN ASSEMBLY

This invention relates to gas turbine engines and more particularly to gas turbine engines of the ducted fan bypass type having a high solidity fan blade configuration thereon with a chord to blade spacing ratio greater than one and more particularly to such an arrangement wherein split blade components are provided to produce a forward thrust of air across the fan assembly and a reverse thrust of air flow through the fan assembly by control of the high solidity airfoil split blade components therein.

It is recognized that reverse thrust can be produced in gas turbine engines of the ducted fan bypass type by rotation of the airfoil blades of the fan between a forward thrust and a reverse thrust position. Such an arrangement is described in U.S. Pat. No. 3,489,338 issued Jan. 13, 1970, to J. A. Chilman. While such arrangements are suitable for their intended purpose they are limited to fan assemblies wherein the airfoil or blade have a chord to blade space relationship which will permit rotation of the individual blade components between a forward thrust position and a position displaced through an angle upon the axis of rotation of each of the blades to a reverse thrust position. In each case the leading and trailing edge of the airfoil remains the same.

An object of the present invention is to improve ducted fan bypass type gas turbine engines by the provision therein of high solidity airfoil components in the fan assembly having a chord to blade space ratio greater than one and wherein the airfoil components of the fan are separated into first and second portions each separately rotatably supported on the fan hub assembly to be movable between forward thrust and reverse thrust position by operator means which produce concurrent rotation of each of the first and second portions from a forward thrust position to a reverse thrust position with each of the first and second blade portions defining portions of a single airfoil in each of the forward and reverse thrust positions.

Still another object of the present invention is to improve ducted fan bypass type gas turbine engines by the provision therein of a fan hub having a plurality of circumferentially located high solidity fan blades thereon each having a blade chord to blade space ratio greater than one and wherein each of the fan blades includes first and second portions separately rotatably supported on the fan hub and rotatable with respect thereto between forward and reverse thrust position with the separate blade portions defining a smooth airfoil section in the forward thrust position to produce an efficient flow of bypass air through the duct during forward thrust operation and the blade portions being configured to define a reverse thrust airfoil in their reverse thrust position wherein the leading edge of the first portion of the forward thrust airfoil is located in juxtaposed relationship with the trailing edge of the second portion, the reverse airfoil shape being suitable for reverse thrust flow of air across the fan duct to produce a reverse thrust on the gas turbine engine.

Yet another object of the present invention is to improve gas turbine engines of the ducted fan bypass type by the provision therein of a plurality of high solidity fan blades each having first and second portions defining a forward thrust airfoil having a chord to blade space ratio greater than one and wherein each of the first and second portions of each fan blade are rotatable to define a second airfoil similarly located relative to the first airfoil and wherein the leading and trailing edges of each of the first and second portions are reversed to define a secondary airfoil shape suitable for reverse flow of air through the ducted fan passage to produce reverse thrust on the gas turbine engine.

Further objects and advantages of the present invention will be apparent from the following description, reference being had to the accompanying drawings wherein a preferred embodiment of the present invention is clearly shown.

FIG. 1 is a partial cross sectional view of a part of a gas turbine engine including the improved reverse thrust high solidity blade components of the present invention;

FIG. 2 is a fragmentary, enlarged cross sectional view taken along the line 2—2 of FIG. 1;

FIG. 3 is an enlarged cross sectional view taken along the line 3—3 of FIG. 1; and FIG. 4 is a fragmentary, enlarged vertical section taken along the line 4—4 of FIG. 1.

Referring now more particularly to the drawings in FIG. 1, an aircraft gas turbine engine 10 of the ducted fan bypass type includes a fragmentary portion of a main gas turbine engine assembly 12 which is of a conventional configuration comprising a compressor, a combustion section, a turbine section, and an exhaust section.

A ducted fan assembly 14 of the engine includes a fixed housing 16 located radially inwardly of an annular, outwardly located airfoil configured shroud 18 that has an air inlet 20 at one end thereof and an air exhaust 22 at the opposite end thereof to an annular airflow passage 24. The fan assembly 14 further includes a rotative subassembly 26 including a hub 28 located in surrounding relationship to the fixed housing 16 being driven by drive means (not shown) located internally of the fixed housing 16 and driven by suitable drive train means from the main gas turbine engine 12 a portion of which is shown in fragmentary form on the discharge end of the shroud 18. The fan assembly 14 is mounted ahead of the compressor of the gas turbine engine 12 and is coupled to shafting (not shown) taken from the compressor for driving the rotatable hub 28.

The outwardly located shroud 18 is supported by a plurality of forward vanes 30 connected to the fixed housing 16 at the base thereof and connected to the inner wall 32 of the outer shroud 18 at the tip thereof. The rear portion of the shroud 18 is supported by a plurality of rearwardly located vanes 33 having their base connected to the outer housing of the engine 12 and at their tips to the inner wall 32 adjacent the outlet opening 22 from the passage 24.

The fan assembly 14, in accordance with the present invention, includes a plurality of circumferentially located fan airfoils 34 having a blade chord to blade space ratio C/S greater than one. More particularly, each of the airfoils 34 includes a first portion 36 with a leading edge 38 and a trailing edge 40. The portion 36 is pivotally supported on a shaft 42 for rotation with respect to the outer surface 44 of the annular hub 28. Each blade 34 further includes a rearward portion 46 having a leading edge 48 and a trailing edge 50. Each rearward portion 46 is supported by a shaft 52 for rotation with respect to the hub 28.

The blade portions 36, 46 combine at a break line 54 formed by a segment 56 on the high pressure surface 58 of the blade portion 36 and a congruent curved surface 60 formed on the low pressure surface 62 of the blade portion 46 when in a forward thrust position shown in solid line in FIG. 2.

When the blade portions 36, 46 are located in a forward thrust position the blade portions 36, 46 define a smooth airfoil configuration from the inlet edge 64 of the hub 28 to the exhaust edge 66 thereof. Furthermore, the combined airfoil portions 36, 46 because of the chord to space ratio greater than one comprise a high solidity fan blade configuration which will produce a high pressure ratio through the passage 24 from the inlet end 20 to the outlet end 22 thereof at high aerodynamic efficiency.

The blade portions 36, 46 are associated with an operator mechanism 68 located inboard of the hub 28. It comprises a cylindrical ring 69 with axially aligned slots 70 into which actuator arms 72 are located, each of which are connected respectively to shafts 42, 52. Rotation of the operator mechanism ring 69 with respect to the rotor hub 28 causes actuator arms 72 to slide and induce rotation of blade shafts 42 and 52 thereby repositioning blade portions 36 and 46 through an angle to provide different juxtapositions required for forward or reverse thrust fan operation.

A like slot mechanism in operator ring 69 is provided for each of the airfoils 34 in the fan assembly 14.

While the embodiments of the present invention, as herein disclosed, constitute a preferred form, it is to be understood that other forms might be adopted.

What is claimed is:

1. A fan assembly for gas turbine engine having an internal hub structure and a radially outward located duct member defining an annular opening between the hub structure and the outer duct having an inlet end and an outlet end, a rotatable fan hub on said engine located radially within said airflow path, a plurality of airfoils supported on said rotatable hub for rotation within said airfoil, each of said airfoils having a first portion and a second portion, means for mounting each of said first and second portions for rotation on said hub, actuator means for actuating said first and second portions for common rotation, said first portion having a leading edge and a trailing edge, said second portion having a leading edge and a trailing edge, said first and second portions being positioned in a forward thrust location to define a smooth airfoil across said first and second portions including a leading edge defined by the leading edge of said first portion and a trailing edge defined by the trailing edge of said second portion, said first and second portions having a chord to blade space ratio greater than one, said actuator means being operable to concurrently rotate said first and second portions to locate the leading edge of a first portion of one of said airfoils and the trailing edge of a second portion of another of said airfoils in juxtaposed relationship to define a reverse thrust airfoil having the leading edge thereof defined by the trailing edge of said first portion and the trailing edge thereof defined by the leading edge of said second portion and operable to produce a reverse flow of air through said duct passage for producing reverse thrust on said engine.

2. A fan airfoil assembly for a ducted fan bypass type gas turbine engine including a radially outwardly directed fan passage having an inlet and an outlet comprising: a rotatable fan hub operable by the gas turbine engine, a plurality of circumferentially spaced high solidity airfoils supported on said rotatable hub having a chord to blade space ratio greater than one, each of said airfoils including first and second portions each having a leading and a trailing edge, said first and second portions each being rotatably supported on said rotatable hub, said first portions being free to rotate through 360° without interference between adjacent ones of said first portions, actuator means for positioning said portions in a forward thrust position wherein the trailing edge of a first portion is located in juxtaposed relationship with the leading edge of the second portion, each of said first and second portions being rotatable by said actuator means through an angle to locate the leading edge of the first portion in juxtaposed relationship to the trailing edge of the second portion to define a plurality of reverse thrust airfoils on said rotatable hub for producing a reverse flow of air through said fan duct passage for producing a reverse thrust on said engine.

3. A fan airfoil assembly for a ducted fan bypass type gas turbine engine including a radially outwardly directed fan passage having an inlet and an outlet comprising: a rotatable fan hub operable by the gas turbine engine, a plurality of circumferentially spaced high solidity airfoils supported on said rotatable hub having a chord to blade space ratio greater than one, each of said airfoils including first and second portions each having a leading and a trailing edge, shaft means for rotatably supporting each of said first and second portions on said rotatable hub, said first portions being freely rotatable through 360° with respect to one another, actuator means for positioning said first and second portions in a forward thrust position wherein the trailing edge of a first portion is located in juxtaposed relationship with the leading edge of the second portion, each of said first and second portions having their shaft means rotatable by said actuator means through an angle to locate the leading edge of a first portion on one of said airfoils in juxtaposed relationship to a trailing edge of a second portion of another of said airfoils to define a plurality of reverse thrust airfoils on said rotatable hub for producing a reverse flow of air through said fan duct passage for producing a reverse thrust on said engine.

4. A fan airfoil assembly for a ducted fan bypass type gas turbine engine including a radially outwardly directed fan passage having an inlet and an outlet comprising: a rotatable fan hub operable by the gas turbine engine, a plurality of circumferentially spaced high solidity airfoils supported on said rotatable hub having a chord to blade space ratio greater than one, each of said airfoils including first and second portions each having a leading and a trailing edge, shaft means for rotatably supporting each of said first and second portions on said rotatable hub, said first portions being freely rotatable through 360° with respect to one another, actuator means for positioning said first and second portions in a forward thrust position wherein the trailing edge of a first portion is located in juxtaposed relationship with the leading edge of the second portion, each of said first and second portions having their shaft means rotatable by said actuator means through an angle to locate the leading edge of a first portion on one of said airfoils in juxtaposed relationship to a trailing edge of a second portion of another of said airfoils to define a plurality of reverse thrust airfoils on said rotatable hub for producing a reverse flow of air through said fan duct passage for producing a reverse thrust on said engine, said shaft means including first and second shafts connected to each of said first and second portions, respectively, each of said first shafts being circumferentially offset from all of said second shafts to permit unobstructed 360° rotation of said first portions with respect to each other and 360° rotation of said second portions with respect to each other.

* * * * *